(No Model.) 2 Sheets—Sheet 2.
T. O'BRIEN.
TANDEM BICYCLE.
No. 386,601. Patented July 24, 1888.
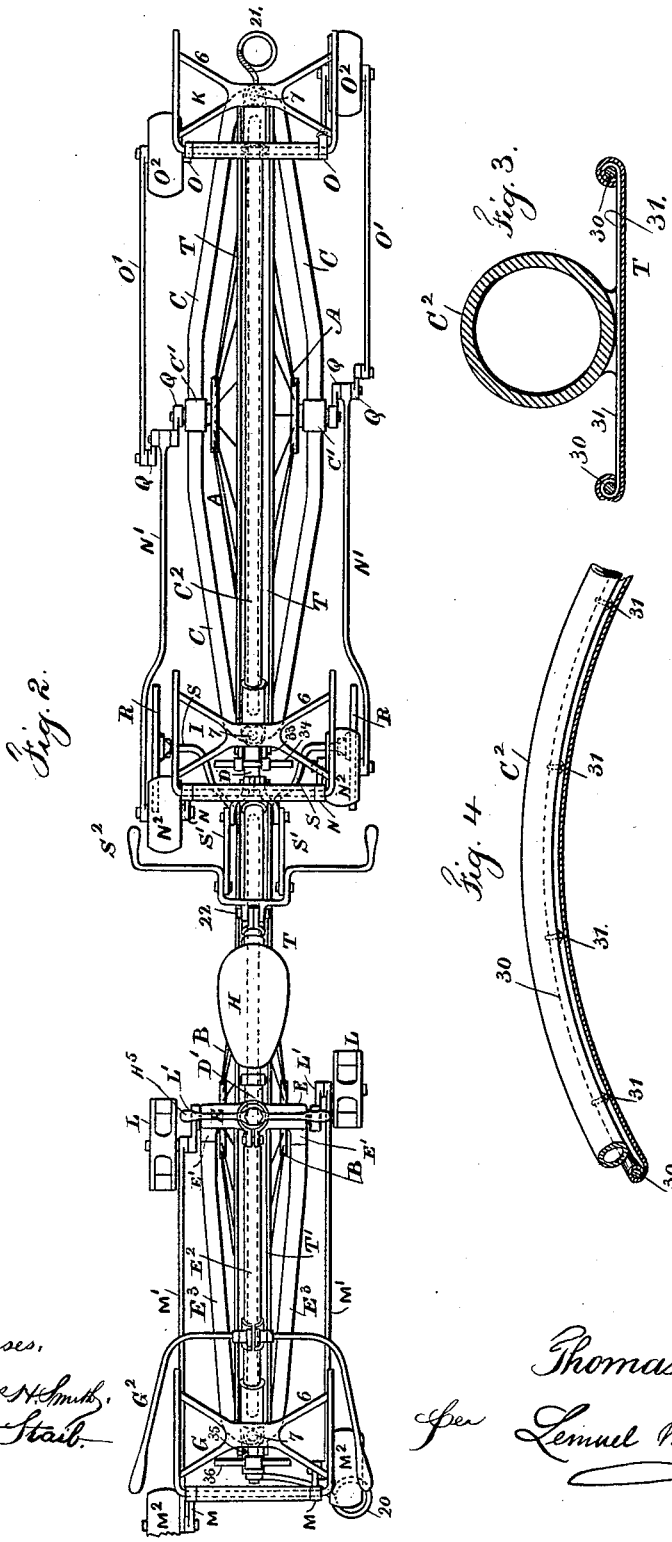
Witnesses,
Chas. H. Smith
J. Staib
Inventor,
Thomas O'Brien
per Lemuel W. Serrell
atty

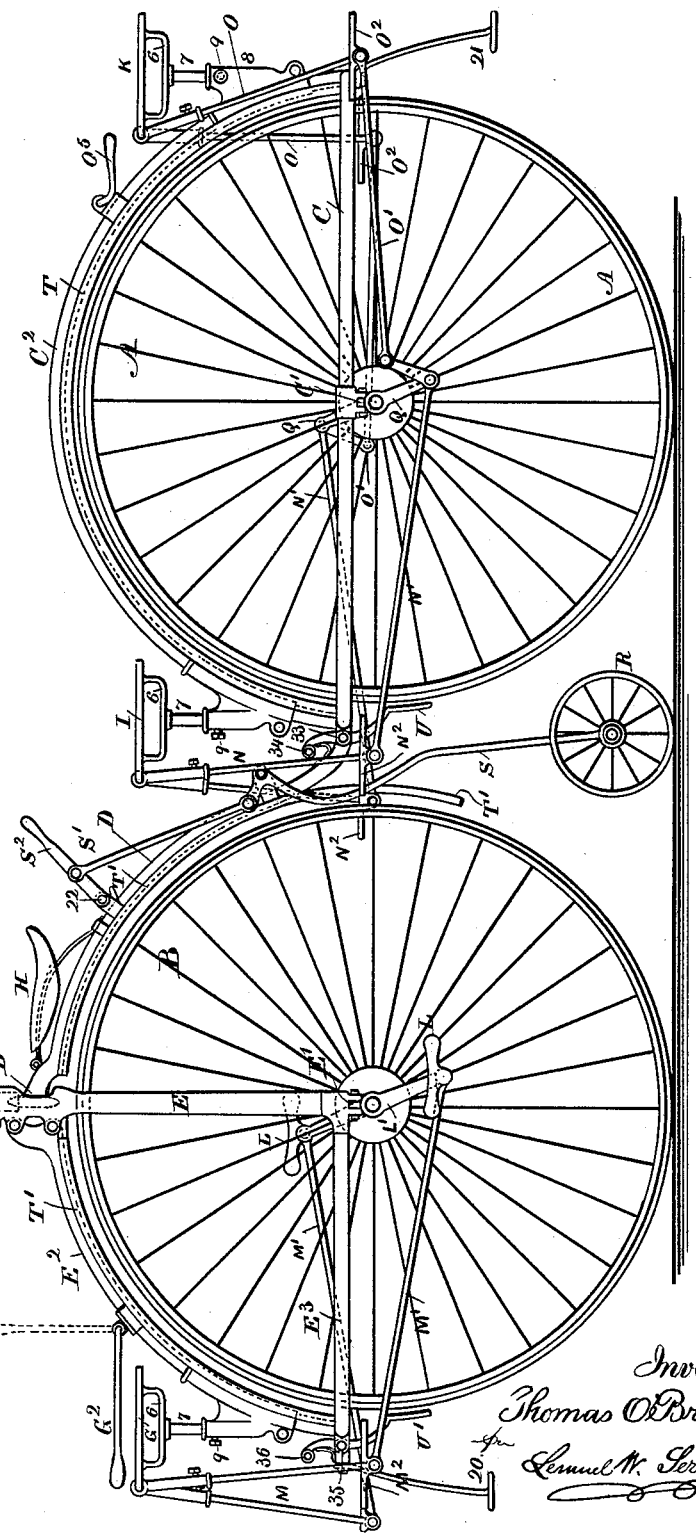

UNITED STATES PATENT OFFICE.

THOMAS O'BRIEN, OF NEW YORK, N. Y.

TANDEM BICYCLE.

SPECIFICATION forming part of Letters Patent No. 386,601, dated July 24, 1888.

Application filed October 24, 1887. Serial No. 253,172. (No model.)

*To all whom it may concern:*

Be it known that I, THOMAS O'BRIEN, of the city and State of New York, have invented an Improvement in Tandem Bicycles, of which the following is a specification.

The object of this invention is to provide for three or four persons riding upon a bicycle tandem, or one in front of the other, and to allow each one to aid in propelling the vehicle.

In the drawings, Figure 1 is a side elevation. Fig. 2 is a plan view with the seats removed. Fig. 3 is a section of the mud-guard, in larger size; and Fig. 4 is a section of the mud-guard and elevation of a portion of the arch that supports the same.

The driving-wheel A and steering-wheel B are of any desired construction. Usually they are made with wire spokes and a rubber tire.

The frame of the machine is usually tubular and brazed together. The horizontal bow C passes around the wheel A and receives the bearings C' for the axle of said wheel A, and the arch $C^2$ extends above the wheel and is connected to the bow C, and at the forward end of the bow C is the spine D, extending upwardly and having a pivot-head, D', that is received into a jaw at the upper end of the fork E, having at its lower end the bearings E' for the axle of the wheel B, and there is a quadrant spine, $E^2$, extending from the upper end of the fork E to the horizontal half-bow $E^3$, the rear ends of which are united to the bearings E'. The object of this construction is to allow the riders to steer the tandem-bicycle without the use of a handle-bar in the manner well known to experts.

I usually provide four seats, G H I K, the seat H being upon the spine D and of any ordinary character, and the rider acts with his feet upon the treadles L and cranks to the shaft of the steering-wheel B, and in so doing aids in propelling the bicycle and in steering it without a handle-bar.

The seats G I K are each supported by cross-springs 6 at the upper ends of the rods 7, that pass into the tubular standards 8, and are clamped by a screw or screw-collar, 9, after being adjusted, and these standards 8 are connected with the arch $C^2$ and quadrant spine $E^2$.

The hanging links M N O are pivoted at their upper ends to the respective seats G I K, and it is preferable to make these links in two parts, one of which is a rod and the other a tube receiving into it the rod, there being a clamping-screw to hold the parts when adjusted.

The connecting-rods M' extend from the lower ends of the pendent links M to the cranks L' of the treadles L, and there are foot-pieces $M^2$ for the feet of the front rider.

The links N' extend from the lower ends of the links N to the cranks Q upon the axis of the wheel A, and the links O' extend from the lower ends of the links O to said cranks Q, and it is preferable to make each crank Q with an arm, as shown, so as to provide two crank-pins, one for the link N' and the other for the link O'.

The foot pieces or treadles $N^2$ $O^2$ are for the feet of the riders upon the respective seats I and K.

The handles $G^2$ are preferably in the form of a bow pivoted to the quadrant spine $E^2$, so that they can be turned up, as indicated by dotted lines, when the rider is mounting the seat G, and afterward turned down at each side of him for steadying the person while riding, and it is preferable to provide stirrups 20 21 to aid the riders in mounting the respective seats G and K.

In order to steady the tandem bicycle while the riders are mounting, I make use of the wheels R within a frame, S, that is pivoted at its upper end to the spine D, and these wheels are sufficiently distant apart to steady the machine, and they can be swung backwardly and upwardly out of contact with the ground when the bicycle is in motion. Any suitable device may be made use of for holding and swinging these steadying-wheels; but I prefer to form crank-arms at the upper ends of the frame S, and to connect the same by the links S' to the handles $S^2$, that are pivoted at 22 upon the spine D, the connection between the parts being that when the handles $S^2$ are thrown up the steadying-wheels R will be swung down upon the ground, and when the rider upon the seat I swings said handles $S^2$ downward the steadying-wheels R will be swung back out of the way, and said handles $S^2$ can be held by the rider to aid in keeping him in position upon the seat I.

The riders upon the seats G I K propel the bicycle by a swinging movement of the legs, the feet acting upon the respective treadles $M^2$ $N^2$ $O^2$.

In order to protect the riders from mud, the guards T T' are applied under the respective spines $C^2$ D $E^2$. Each mud-guard is made of a strip of canvas or leather fastened at the ends and at the edges to a wire frame, 30, (see Fig. 3,) there being cross-pieces 31 brazed to the under side of the respective spines and connected at their ends to the wire frames. Thereby the mud-guards are light and strong, and can be easily replaced when necessary.

A brake, U, is pivoted at 33 to the spine D, and there is an arm extending above the pivot with a cross bar, 34, upon which the foot of the rider can be placed to bring the brake into action against the tire of the wheel A, and there is a brake, U', for the steering-wheel B, said brake being pivoted at 35 to the frame $E^3$, and provided with a cross-bar, 36, for the foot of the rider upon the seat G. Handle-bars are provided at $H^5$ and $O^5$ for the riders upon the seats H and K, respectively. The handle bar $O^5$ is shown only in Fig. 1.

I claim as my invention—

1. The combination, with the wheels A B, of a frame composed of the bow C and arch $C^2$ at the wheel A, the curved spine D, rising above the wheel B, the fork E, quadrant spine $E^2$, and half-yoke $E^3$, and the head D', pivoted to the top upper end of the fork E and the seats G, I, and K, and the standards for supporting the same, substantially as set forth.

2. The combination, with the two wheels A B, and the frame connecting the same pivoted at D', of the seat H upon the spine D, the crank L', and treadles L, the seat G in front of the wheel B, the pendent links M, and connecting-rods M', substantially as set forth.

3. The combination, in a bicycle, of two wheels and the frame for connecting the same, the cranks, connecting-rods, pendent links, and treadles or foot-pieces, and three seats, one in front of the bicycle, one behind, and one between the two wheels, the pendent links being connected at their upper ends to the respective seats, substantially as set forth.

4. The combination, in a bicycle, of two wheels, the connecting-frames, the three seats, pendent links, treadles, and cranks, two steadying-wheels, a frame for supporting the same pivoted at its upper end to the spine D of the frame-work, links connected to the frame, and handles for swinging the steadying-wheels down into position and raising the same, substantially as set forth.

Signed by me this 20th day of October, 1887.

THOMAS O'BRIEN.

Witnesses:
Geo. T. Pinckney,
William G. Mott.